United States Patent
Huang et al.

(10) Patent No.: US 10,252,241 B1
(45) Date of Patent: Apr. 9, 2019

(54) SPRING TUBE TYPE FLEXIBLE MICRO CHEMICAL REACTOR

(71) Applicant: Dongguan University of Technology, Dongguan (CN)

(72) Inventors: Simin Huang, Dongguan (CN); Kui He, Dongguan (CN); Guanfeng Qin, Dongguan (CN)

(73) Assignee: DONGGUAN UNIVERSITY OF TECHNOLOGY, Dongguan (CN)

( * ) Notice: Subject to any disclaimer, the term of this patent is extended or adjusted under 35 U.S.C. 154(b) by 0 days.

(21) Appl. No.: 16/004,149

(22) Filed: Jun. 8, 2018

(30) Foreign Application Priority Data

Sep. 29, 2017 (CN) .......................... 2017 1 0909020

(51) Int. Cl.
*B01J 19/24* (2006.01)
(52) U.S. Cl.
CPC .................................. *B01J 19/243* (2013.01)
(58) Field of Classification Search
CPC ....................................................... B01J 19/243
USPC ........................................................ 422/129
See application file for complete search history.

(56) References Cited

U.S. PATENT DOCUMENTS

| | | | | |
|---|---|---|---|---|
| 5,534,328 A | * | 7/1996 | Ashmead ............... | B01F 5/0604 210/150 |
| 2006/0165570 A1 | * | 7/2006 | Knopf .................. | B01J 19/0046 422/224 |
| 2007/0163175 A1 | * | 7/2007 | Kihara ................. | B01J 19/0093 48/61 |
| 2010/0178214 A1 | * | 7/2010 | Marques .............. | B01J 19/0093 422/139 |
| 2015/0027555 A1 | * | 1/2015 | Chen .................. | B01L 3/502784 137/13 |
| 2017/0234799 A1 | * | 8/2017 | Marks ............... | B01L 3/502753 356/301 |

* cited by examiner

*Primary Examiner* — Huy Tram Nguyen
(74) *Attorney, Agent, or Firm* — Aeon Law PLLC; Adam L. K. Philipp; Manasi Vakil

(57) ABSTRACT

The present invention provides a spring tube type flexible micro chemical reactor. It comprises a reactor body, a thermal control device, and a gas generating device. The spring tube type flexible micro chemical reactor enhances the heat and mass transfer using the scroll spring tube, which is able to achieve accurate mixing and dynamic adjustment of the heat and mass transfer and is able to effectively solve the problems of blocking of channels by solid reactant, the poor portability of the reaction, etc.

15 Claims, 4 Drawing Sheets

SPRING TUBE TYPE FLEXIBLE MICRO CHEMICAL REACTOR

TECHNICAL FIELD

The present invention relates to the technical field of micro-nanometer manufacturing and in particular, to a spring tube type flexible micro chemical reactor.

BACKGROUND

In the field of fine chemicals or drug synthesis, the temperature control requirements during the reaction process are extremely strict. For example, in the drug synthesis, a temperature difference of several degrees would cause a change of the chemical composition of the product. The traditional temperature control system adopts the convection-heating method, and the reaction speed is relatively slow. The chemical reaction is often completed but the temperature is still at the relaxation time. In order to accurately control the reaction temperature, a micro reactor suitable for the synthesis of heat-sensitive substances has been developed. The micro reactor is a three-dimensional structural element, which is made of solid substrates using special micromachining techniques and can be used to perform chemical reactions. The micro reactor typically contains a smaller channel size (0.01 to 1 mm) and channel diversity. Fluids can flow and react as required in these channels. Microfabricated chemical devices have a very large ratio of surface area to volume, and thus it enables the accurate control of the fluid temperature in a micro channel multiphase reaction system. At present, the micro channel reactor has been widely used, especially in the field of drug development or fine chemicals.

The flow state of the fluid in the micro channel is generally laminar, which will result in a poor heat transfer capability of the fluid itself. Especially when the channel size is enlarged to the millimeter level, the actual need of reaction is far from being met only by diffusion heat and mass transfer. In order to solve the above problems, the micro channel is usually machined into various shapes. The purpose is to use the secondary flow generated by these structures to enhance the heat and mass transfer, but there are disadvantages of complicated machining technology and high machining costs. In addition, the existing micro channel reactor also have the following two disadvantages: 1. The heat and mass transfer capacity of the micro channels can only be adjusted by the flow rate; the adjustment range is relatively narrow; the portability of the device is poor and the reactor has to be designed according to different reaction; 2. Chemical reactions in which solid product is formed can easily lead to micro channel blocking. Therefore, the development of a new type of micro reactor with a simple structure, and a wide range of adjustment of heat and mass transfer capacity, and a certain anti-blocking function has become an urgent need in the field of micro chemical reactions. In the meantime, the new type of micro reactor is required to be able to achieve rapid mixing, heat exchange and reaction within a narrow range, and to be able to achieve a wide range of regulation and control of experimental conditions.

Chinese invention patent CN104959093A discloses a method for solving the problem of blocking due to particles in channels of a micro reactor. At regular intervals, the cylinder with the micro channels engraved on the surface is disassembled for cleaning. The micro reactor needs to be disassembled and washed regularly, which is inconvenient to use. Chinese invention patent CN104923137A discloses a method for enhancing the mixing of multiple fluids in a micro reactor. This method requires the use of ultrasonic equipment to cause fluid oscillations, and the apparatus is relatively complicated. Chinese invention patent CN102618063A discloses a method for preparing a water-soluble azo dye continuously by the chaos mixing of a spiral tube. The method uses a spiral tube to generate secondary flow to enhance heat and mass transfer, but its heat and mass transfer effect cannot be adjusted. Chinese invention patent CN103328092A discloses an oscillating flow micro reactor, which mainly achieves the effect of enhancing mixing by the design of staggered flow, but the reactor structure is complicated to be machined. The above patents mainly consider how to achieve the prevention of the solid blocking of micro channels and how to achieve the technology of reinforcement and mixing. The dynamic regulation and control requirements of the mixing heat and mass transfer of the reactor are not taken into account. At the same time, the design of the product has defects of the complicated machining and too high manufacturing cost. With the development of micro channel reactors in the direction of generalization, portability, and multiphase, the requirements for the automatic adjustment of heat exchange and mixing of the micro reactor and for the anti-blocking performance of the reactor are becoming higher and higher. This requires a new type of micro chemical reactor to be designed to meet these needs.

SUMMARY OF THE INVENTION

In order to overcome the deficiencies of the prior art, the object of the present invention is to provide a spring tube type flexible micro chemical reactor. The flexible micro chemical reactor has a simple structure, a wide range of the adjustment of the heat and mass transfer, and is able to achieve accurate mixing and dynamic adjustment of the heat and mass transfer. It can also effectively solve the problems such as the blocking of channels by solid reactant, the poor portability of the reaction, and so on.

To solve the above-mentioned problems, the present invention adopts the following technical solutions:

A spring tube type flexible micro chemical reactor, comprises: a reactor body for performing a micro chemical reaction, comprising a scroll spring tube which is fixed inside a thermal control device, the scroll spring tube being provided with an access interface; a thermal control device for accommodating a heat transfer medium, the thermal control device being provided with an inner cavity for accommodating the heat transfer medium, and a heat transfer medium inlet and a heat transfer medium outlet which are communicated with the inner cavity, the thermal control device being further provided with a reactor connector which is communicated with the access interface of the scroll spring tube; and a gas generating device for supplying a gas to the reactor body, the gas being supplied by the gas generating device to the scroll spring tube via the reactor connector.

It can be seen from the above solution that the present invention enhances the heat and mass transfer via the micro tube of the scroll spring tube, and at the same time, a secondary flow is generated to further enhance the mass transfer and heat transfer by using a vortex-like structure of the scroll spring tube and the vibration of the spring tube. The introduction of gas into the micro tube of the scroll spring tube via the gas generating device causes disturbance to the reaction liquid and can effectively enhance the mixing effect. The invention has a simple structure, a small size, a high integration, a high efficiency of the heat and mass transfer, and can quantitatively control the heat and mass transfer according to different chemical reactions, which is especially applicable to some strong exothermic chemical reactions that require strict temperature control. It can be widely used in the fields, such as fine chemicals, drug synthesis, and so on.

As a preferred embodiment of the present invention, the spring tube type flexible micro chemical reactor further comprises a control component for controlling the vibration frequency of the scroll spring tube, the control component comprising a magnetic force receiving element, a magnetic force exerting element, and an electromagnetic control member, the magnetic force receiving member being fixed at a center of the scroll spring tube, the magnetic force exerting element being an electromagnet that is externally and/or internally placed in thermal control device at a position corresponding to the magnetic force receiving element, the electromagnetic control member being connected with the force exerting element. As a preferred embodiment of the present invention, the magnetic force receiving element is an AlNiCo permanent magnet. A permanent magnet which serves as a force receiving point of the magnetic force control is fixed at a center position of the scroll spring tube. The scroll spring tube is caused to oscillate by electromagnetic control, thereby further enhancing the mixing effect. And at the same time, it may also prevent the deposition of solid substances on the inner wall of the tube.

As a preferred embodiment of the present invention, the reactor body further comprises a first group of temperature sensors, and the first group of temperature sensors are respectively provided at an outlet and an inlet of the reactor, for monitoring the temperature of the reaction liquid at the outlet and the inlet in real time.

As a preferred embodiment of the present invention, the reactor body further comprises a pressure sensor provided at the access interface, for monitoring the pressure of the reaction liquid at the access interface of the reactor body in real time.

As a preferred embodiment of the present invention, conical sealing joints are respectively provided at the outlet and the inlet of the reactor body, an annular groove being provided on the outer periphery of the conical sealing joint, an annular sealing ring being sleeved on the annular groove, and the access interface is sealed and cooperated with the thermal control device via the conical sealing joint.

As a preferred embodiment of the present invention, the scroll spring tube is made of a nickel-based alloy material, and an inner wall of the scroll spring tube is further coated with a ceramic layer.

As a preferred embodiment of the present invention, the scroll spring tube has a vortex-like shape or spiral shape as a whole.

As a preferred embodiment of the present invention, the thermal control device further comprises a cylinder body and a cover body detachably cooperated and connected with the cylinder body, the reactor connector, the heat transfer medium outlet and the heat transfer medium inlet being provided at the cover body.

As a preferred embodiment of the present invention, the manner that the cylinder body is detachably cooperated with the cover body is a screw connection or a snap connection.

As a preferred embodiment of the present invention, a rubber sealing ring is provided at a position where the cylinder body is detachably cooperated with and connected to the cover body.

As a preferred embodiment of the present invention, the cylinder body is further provided with a second group of temperature sensors for monitoring the temperature of the heat transfer medium in the inner cavity of the thermal control device.

As a preferred embodiment of the present invention, the reactor connector comprises a fixing boss, a reaction liquid output interface, a reaction liquid input interface and a gas introduction interface being fixed on the fixing boss, the reaction liquid output interface being cooperatively connected with an outlet of an access interface, the reaction liquid input interface being cooperatively connected with a inlet of the access interface, the gas introduction interface being communicated with the gas generating device.

As a preferred embodiment of the present invention, the spring tube type flexible micro chemical reactor further comprises a connecting tube, one end of the connecting tube being communicated with the gas generating device, the other end of the connecting tube being communicated with the gas introduction interface.

As a preferred embodiment of the present invention, the gas generating device further comprises a gas flow controller provided at the external of the reactor, the gas flow controller being used for the quantitatively control of the mixing effect of the introduced gas.

Compared with the prior art, the advantages of the present invention is as follows: the spring tube type flexible micro chemical reactor of the present invention enhances the heat and mass transfer using the micro tube of the scroll spring tube, and at the same time, a secondary flow is generated by using a vortex-like structure of the scroll spring tube to further enhance the mass and heat transfer. The introduction of gas into the micro tube of the scroll spring tube via the gas generating device causes disturbed flow field to the reaction liquid, which can effectively enhance the mixing effect. And at the same time, it may also prevent the sediment of solid substances on the inner wall of the tube. A permanent magnet which serves as a force receiving body is fixed at a center position of the scroll spring tube, and the scroll spring tube is caused to oscillate by electromagnetic control, thereby further enhancing the mixing effect. And at the same time, it may also prevent the deposition of solid substances on the inner wall of the tube. The invention has a simple structure, a small size, a high integration, a wide range of the adjustment of the heat and mass transfer, and a high heat transfer and mass transfer efficiency, which is able to achieve accurate mixing and dynamic adjustment of the heat and mass transfer, and can quantitatively control the heat and mass transfer according to different chemical reactions, and is especially applicable to some strong exothermic chemical reactions that require strict temperature control and has strong portability. It can be widely used in the fields such as fine chemicals, drug synthesis and so on.

wherein: 1, reactor body; 11, scroll spring tube; 111, access interface; 12, permanent magnet; 13, conical sealing joint; 14, annular sealing ring; 2, thermal control device; 21, cylinder body; 22, cover body; 23, heat transfer medium inlet; 24, heat transfer medium outlet; 25, electromagnet; 3, reactor connector; 31, fixing boss; 32, reaction liquid outlet; 33, reaction liquid inlet; 34, gas introduction interface.

DETAILED DESCRIPTION OF THE PREFERRED EMBODIMENT

The present invention is further described with reference to the accompanying drawings and specific embodiment.

Figure 1:
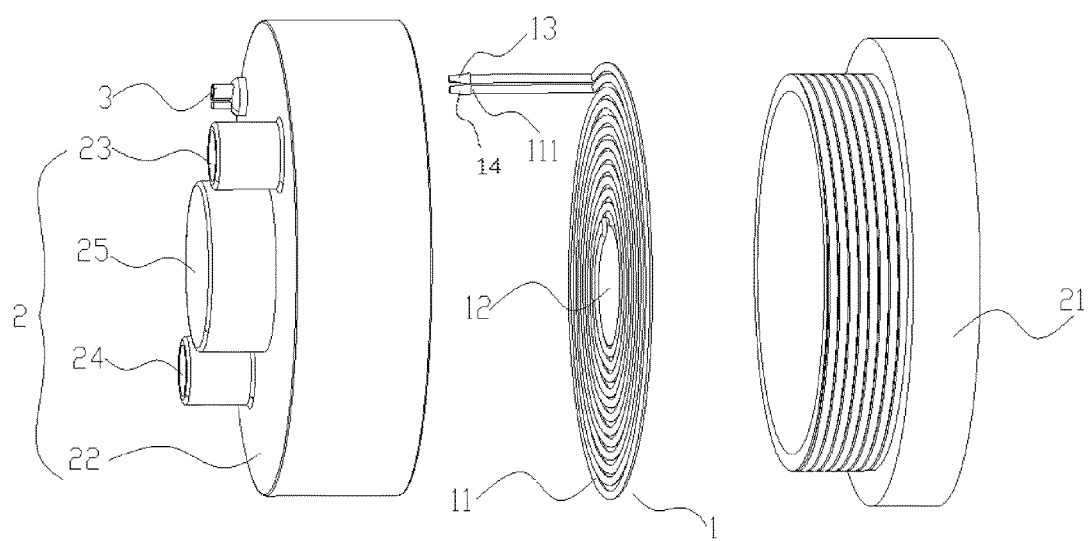
FIG. 1 is an exploded view of a spring tube type flexible micro chemical reactor according to the present invention.
Figure 2:
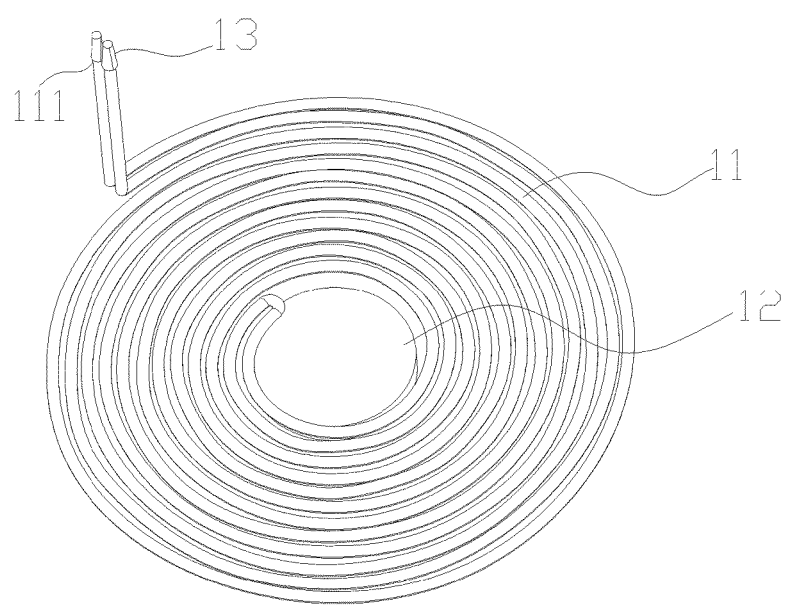
FIG. 2 is a schematic structural view of a scroll spring tube according to the present invention.
Figure 3:
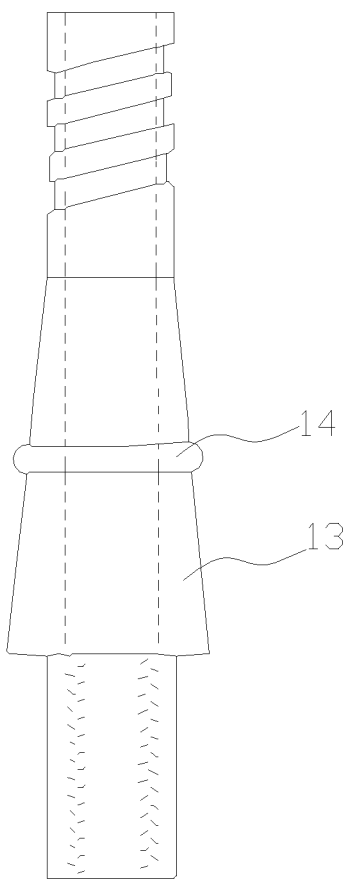
FIG. 3 is a schematic view of a conical sealing joint according to the present invention.
Figure 4:
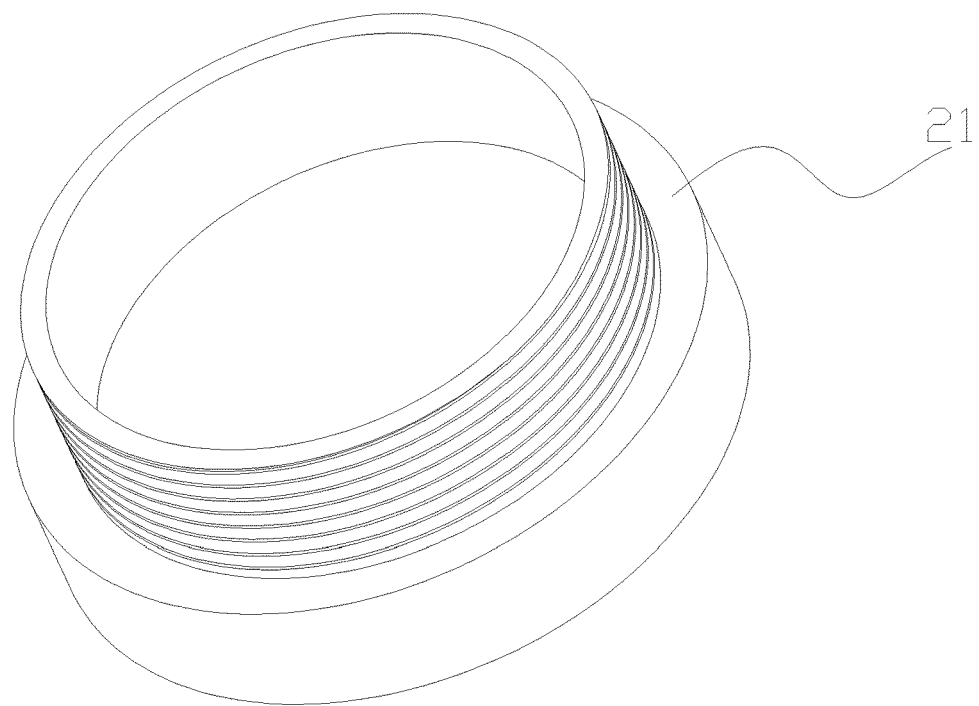
FIG. 4 is a schematic structural view of a cover body of a thermal control device according to the present invention.
Figure 5:
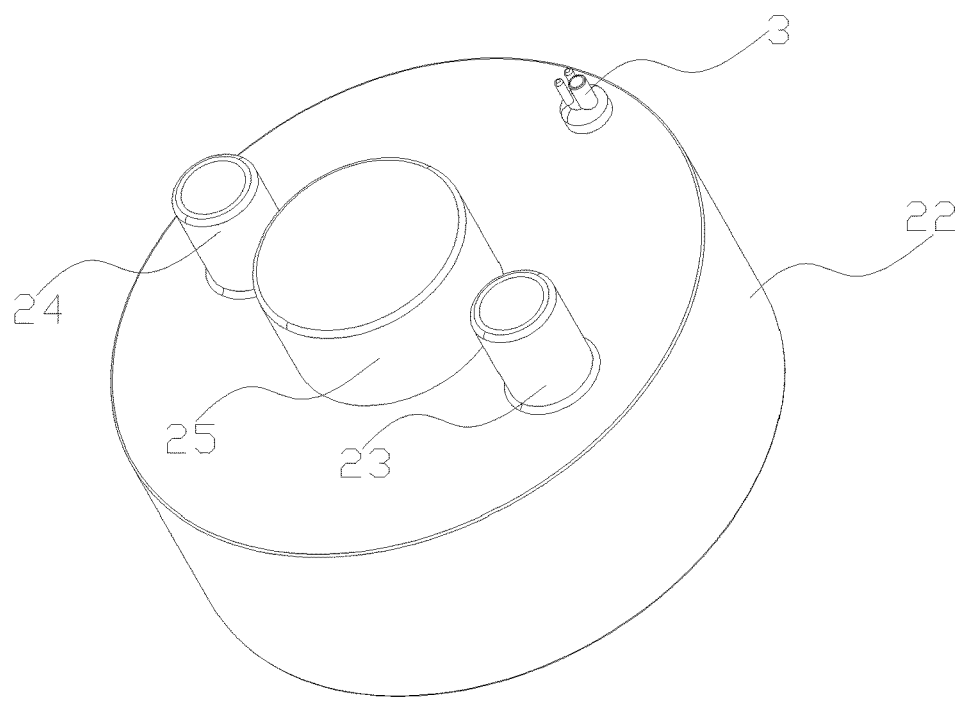
FIG. 5 is a schematic structural view of a cylinder body of the thermal control device according to the present invention.
Figure 6:
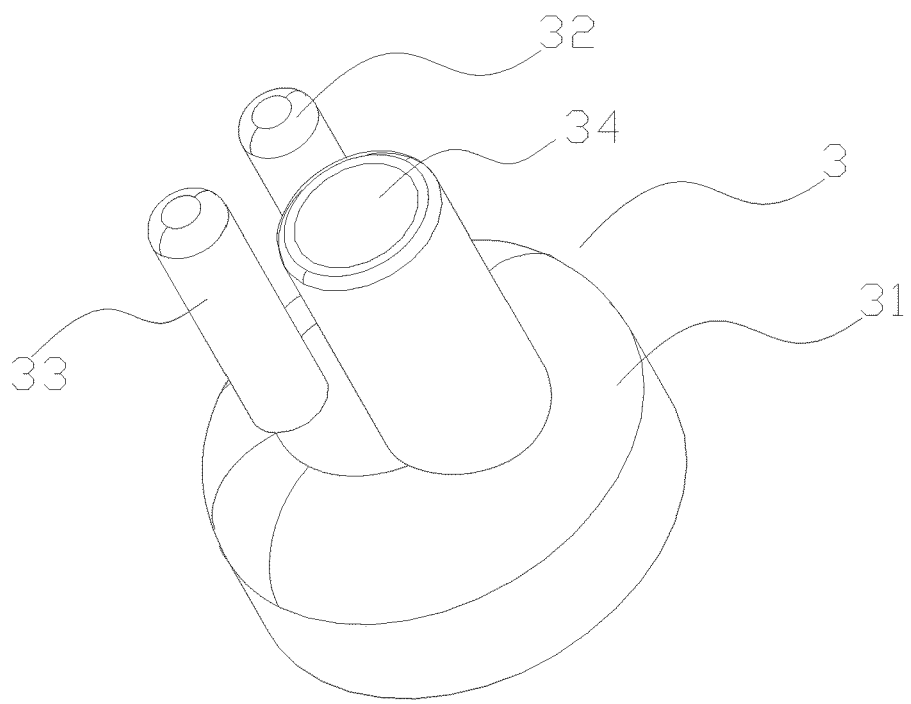
FIG. 6 is a schematic structural view of a reactor connector according to the present invention.
Figure 7:
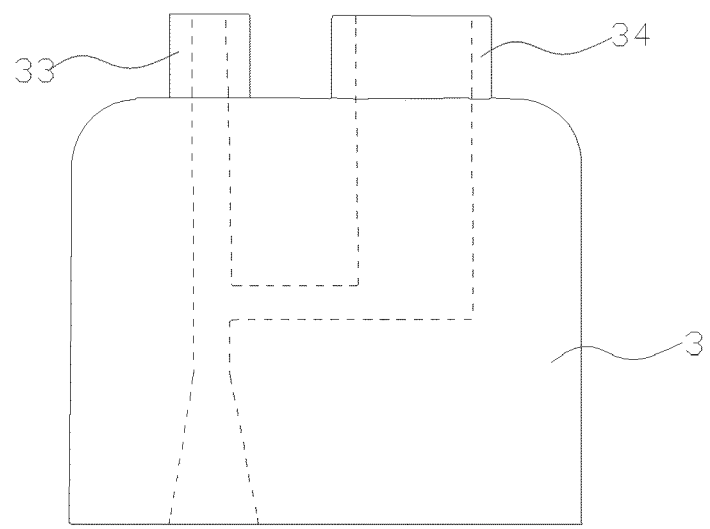
FIG. 7 is a schematic view shows how a reaction liquid inlet is connected with the interior of a gas introduction interface in a gas generating device of the present invention.

As shown in FIGS. 1-7, a spring tube type flexible micro chemical reactor according to the present invention, which comprises a reactor body 1 for performing a micro chemical reaction, a thermal control device 2 equipped with a heat transfer medium, and a gas generating device for supplying a gas to the reaction body (FIG. 7).

The reactor body 1 comprises a permanent magnet 12 and a scroll spring tube 11 having an access interface 111. The scroll spring tube 11 is fixed inside the thermal control device 2 via angle iron, and the heat and the mass transfer effect is enhanced by the micro tube of the scroll spring tube 11. The scroll spring tube 11 is a hollow structure and has a vortex-like or spiral shape as a whole so as to achieve a compact structure. At the same time, a secondary flow is generated by using a vortex-like or a spiral structure to enhance the mass and heat transfer. The scroll spring tube 11 is made of nickel-based alloy material, $Ni_{42}CrTi$, such that it has enough flexibility and elasticity. The preparation process is as follows: at first, the nickel-base alloy is melted and cast to make the tube blank, and then it is formed by the drawing of a drawing machine; a micro tube with an inner diameter of less than 1 mm and an outer diameter of 2.5 mm is obtained; the micro tube is then completed by the rolling of the spring machine, the stress relief annealing, and the torque-arm machining. Preferably, the scroll spring tube 11 has a maximum outer diameter of 50 mm, a tube diameter of 2.5 mm, and an inner diameter of less than 1 mm, which enables the scroll spring tube 11 to have a high specific surface area, and enables rapid heat and mass transfer. Since the scroll spring tube 11 is made of an alloy material and is relatively easy to be corroded during the reaction, the inner tube wall of the scroll spring tube 11 is coated with a ceramic layer by a dry vacuum coating method. The thickness of the ceramic layer is preferably 20 μm, which can effectively prevent the corrosion of the scroll spring tube 11 by strong acid and strong alkali, and to a certain extent, ensures the stability of the reaction and prolongs the service life of the scroll spring tube 11.

The access interface 111 of the scroll spring tube 11 extends vertically upwards and is perpendicular to the scroll spring tube 11, and an outlet and an inlet of the access interface 111 are respectively sealed and cooperated with the thermal control device 2 via a conical sealing joint 13. An annular groove is provided on the outer periphery of the conical seal joint 13, and an annular seal ring 14 is sleeved on the annular groove, such that the connection between the access interface 111 and the thermal control device 2 is tighter. Further, an upper end of the conical seal joint 13 is provided with thread such that it is in threaded connection with the thermal control device 2. In order to solve the problem that, due to the fineness of the tube, the micro chemical reactor cannot be applied to a reaction in which a solid substance is produced. A permanent magnet 12 is fixed at a center position of the scroll spring tube 11 in a manner such as snap connection, gluing, and so on. The permanent magnet 12 serves as a force receiving point of the magnetic force control. An electromagnet 25 located on the thermal control device 2 is controlled via an external electromagnetic control circuit. The permanent magnet on the spring tube causes the scroll spring tube 11 to oscillate and control the vibration frequency thereof, thereby further enhancing the mixing effect. And at the same time, it may also prevent the deposition of solid substances on the inner wall of the tube, thus the present invention is applicable to a chemical reaction with trace solid substances. Preferably, the permanent magnet 12 is an AlNiCo permanent magnet 12, and the AlNiCo alloy is resistant to a high temperature of 600° C. The weight of the permanent magnet 12 is preferably 5 to 10 g.

Further, the reactor body 1 further comprises two groups of temperature sensors (not shown) and a pressure sensor (not shown); the temperature sensors are respectively provided at the outlet and the inlet of the access interface 111 of the scroll spring tube 11, for monitoring the temperature of the reaction liquid at the outlet and the inlet in real time; the pressure sensor is provided at the inlet of the access interface 111. The temperature sensors and the pressure sensor may also be provided on the conical sealing joint 13 as long as the temperature or pressure of the reaction liquid can be monitored. The real-time monitoring of the temperature and pressure by the temperature sensors and the pressure sensor can achieve precise regulation and control of the experimental conditions, such that the present invention is applicable to some strong exothermic chemical reactions that require strict temperature control.

Specifically, the thermal control device 2 has a cavity for mounting a heat transfer medium. A scroll spring tube 11 is provided in the inner cavity. The thermal control device 2 is provided with a heat transfer medium inlet 23 and a heat transfer medium outlet 24 which are communicated with the inner cavity, and a reactor connector 3 which is connected to the access interface 111. Specifically, the thermal control device 2 comprises a cylinder body 21 and a cover body 22 matched with the cylinder body 21. A reactor connector 3, the heat transfer medium outlet 24 and the heat transfer medium inlet 23 are each provided in the cover body 22. The cylinder body 21 is detachably sealed and connected with the cover body 22. The cylinder body 21 and the cover body 22 form an inner cavity for mounting the heat transfer medium, and a flow rate of the circulating heat transfer medium is controlled via the heat transfer medium inlet 23 and the heat transfer medium outlet 24, thus temperature control in the reactor is achieved. Further, a temperature sensor (not shown) for monitoring the temperature of heat transfer medium in real time is provided inside the cylinder body 21 such that the temperature control in the reactor is more accurate. Furthermore, a rubber seal ring is provided between the cylinder body 21 and the cover body 22 to improve the sealing of the thermal control device 2 and to prevent the heat transfer medium from leaking. The connecting manner between the cylinder body 21 and the cover body 22 is not limited, as long as the detachable sealing and connection can be achieved. For example, it can be screwed connection: the cylinder body 21 is provided with external thread, and an inner wall of the cover body 22 is provided with internal thread matched with external thread; and it may also be a snap connection: for instance, the cylinder body 21 and the cover body 22 are respectively provided with card slots and fixture blocks matched with each other. In order to prevent the corrosion and rusting, the material of the cylinder body 21 and the cover body 22 is preferably stainless steel or plastic. A thermal insulation material may be provided on the outer periphery of the thermal control device 2 to reduce the heat loss of the heat transfer medium. Preferably, the cylinder body 21 has a height of 10 mm, an inner diameter of 45 mm, and an outer diameter of 55 mm. The permanent magnet 12 in the scroll spring tube 11 can induce oscillation of the scroll spring tube 11 by electromagnetic control via an external electromagnet 25. A electromagnet 25 may also be fixedly provided at a position of the cover body 22 corresponding to the center of thermal control device, and then the electromagnet 25 and the permanent magnet 12 is controlled to induce oscillation of the scroll spring tube 11 via an external electromagnetic controller.

The reactor connector 3 on the cover body 22 is communicated with the access interface 111 of the scroll spring tube 11. The conical sealing joint 13 is provided between the reactor connector 3 and the access interface 111. Specifically, the reactor connector 3 comprises a fixing boss 31. A reaction liquid outlet 32, a reaction liquid inlet 33 and a gas introduction interface 34 are provided on the fixing boss 31. The reaction liquid outlet 32 is matched with the outlet of the access interface 111, and the reaction liquid inlet 33 is matched with the inlet of the access interface 111. The reaction liquid outlet 32, the reaction liquid inlet 33, and the gas introduction interface 34 are each in screwed connection with the external tube. The gas introduction interface 34 is communicated with the reaction liquid inlet 33, and the gas is supplied by the gas generating device to the scroll spring tube 11 via the reactor connector. When there is no need to introduce gas to disturb the reaction, the gas introduction interface 34 can be closed and sealed to prevent unnecessary external factors from affecting the reaction. The introduction of gas into the micro tube of the scroll spring tube 11 via the gas generating device causes disturbance to the reaction liquid and can effectively enhance the mixing effect. Specifically, the gas generating device comprises a connecting tube (not shown) and a gas flow controller (not shown). One end of the connecting tube is communicated with the gas flow controller, and the other end of the connecting tube is communicated with the gas introduction interface 34. The quantitative control of the mixing effect can be achieved by the gas flow controller and the electromagnet 25 controller.

The invention has a simple structure, a small size, a high integration, a high heat and mass transfer efficiency, and can quantitatively controls the heat and mass transfer according to different chemical reactions, and is able to achieve accurate mixing and dynamic adjustment of heat and mass transfer, which is especially suitable for applicable to some strong exothermic chemical reactions that require strict temperature control and has strong portability. It can be widely used in the fields, such as fine chemicals, rapid screening of catalyst, drug synthesis and so on.

The above-described embodiment is just an preferred embodiment of the present invention, but not limitation to the scope of protection of the present invention. Any insubstantial changes and replacements made by those skilled in the art based on the present invention all falls within the scope of protection claimed by the present invention.

What is claimed:

1. A spring tube type flexible micro chemical reactor, characterized in that, the spring tube type flexible micro chemical reactor comprises:
   a reactor body for performing a micro chemical reaction, comprising a scroll spring tube which is fixed inside a thermal control device, the scroll spring tube being provided with an access interface connected with the thermal control device;
   the thermal control device for accommodating a heat transfer medium, the thermal control device being provided with an inner cavity for accommodating the heat transfer medium, and a heat transfer medium inlet and a heat transfer medium outlet which are communicated with the inner cavity, the thermal control device being further provided with a reactor connector which is communicated with the access interface of the scroll spring tube; and
   a gas generating device for supplying a gas to the reactor body, the gas being supplied by the gas generating device to the scroll spring tube via the reactor connector.

2. The spring tube type flexible micro chemical reactor according to claim 1, wherein the spring tube type flexible micro chemical reactor further comprises a control component for controlling the vibration frequency of the scroll spring tube, the control component comprising a magnetic force receiving element, a magnetic force exerting element, and an electromagnetic control member, the magnetic force receiving member being fixed at a center of the scroll spring tube, the magnetic force exerting element being an electromagnet that is externally and/or internally placed in thermal control device at a position corresponding to the magnetic force receiving element, the electromagnetic control member being connected with the force exerting element via an external circuit.

3. The spring tube type flexible micro chemical reactor according to claim 2, wherein the magnetic force receiving element is an AlNiCo permanent magnet.

4. The spring tube type flexible micro chemical reactor according to claim 1, wherein the reactor body further comprises a first group of temperature sensors, and the first group of temperature sensors are respectively provided at an outlet and an inlet of the reactor, for monitoring the temperature of the reaction liquid at the outlet and the inlet in real time.

5. The spring tube type flexible micro chemical reactor according to claim 1, wherein the reactor body further comprises a pressure sensor provided at the access interface, for monitoring the pressure of the reaction liquid at the access interface of the reactor body in real time.

6. The spring tube type flexible micro chemical reactor according to claim 1, wherein conical sealing joints are respectively provided at the outlet and the inlet of the reactor body, an annular groove being provided on the outer periphery of the conical sealing joint, an annular sealing ring being sleeved on the annular groove, and the access interface is sealed and cooperated with the thermal control device via the conical sealing joint.

7. The spring tube type flexible micro chemical reactor according to claim 1, wherein the scroll spring tube is made of a nickel-based alloy material, and an inner wall of the scroll spring tube is further coated with a ceramic layer.

8. The spring tube type flexible micro chemical reactor according to claim 1, wherein the scroll spring tube has a vortex-like shape or spiral shape as a whole.

9. The spring tube type flexible micro chemical reactor according to claim 1, wherein the thermal control device further comprises a cylinder body and a cover body detachably cooperated and connected with to the cylinder body, the reactor connector, the heat transfer medium outlet and the heat transfer medium inlet being provided at the cover body.

10. The spring tube type flexible micro chemical reactor according to claim 9, wherein the manner that the cylinder body is detachably cooperated with the cover body is a screw connection or a snap connection.

11. The spring tube type flexible micro chemical reactor according to claim 9, wherein a rubber sealing ring is provided at a position where the cylinder body is cooperatively connected with the cover body.

12. The spring tube type flexible micro chemical reactor according to claim 1, wherein the cylinder body is further provided with a second group of temperature sensors for monitoring the temperature of the heat transfer medium in the inner cavity of the thermal control device.

13. The spring tube type flexible micro chemical reactor according to claim 9, wherein the reactor connector comprises a fixing boss, a reaction liquid output interface, a reaction liquid input interface and a gas introduction interface being fixed on the fixing boss, the reaction liquid output interface being cooperatively connected with an outlet of an access interface of the cover body, the reaction liquid input interface being cooperatively connected with a inlet of the access interface of the cover body, the gas introduction interface being communicated with the gas generating device.

14. The spring tube type flexible micro chemical reactor according to claim 1, wherein the spring tube type flexible micro chemical reactor further comprises a connecting tube, one end of the connecting tube being communicated with the gas generating device, the other end of the connecting tube being communicated with the gas introduction interface.

15. The spring tube type flexible micro chemical reactor according to claim 1, wherein the gas generating device further comprises a gas flow controller provided at the external of the reactor, the gas flow controller being used for the quantitatively control of the mixing effect of the introduced gas.

* * * * *